(12) United States Patent
Krause et al.

(10) Patent No.: US 8,220,605 B2
(45) Date of Patent: Jul. 17, 2012

(54) POWER TRANSMISSION MECHANISM

(75) Inventors: Thorsten Krause, Buehl (DE);
Benjamin Daniel, Pforzheim (DE)

(73) Assignee: Schaeffler Technologies AG & Co. KG,
Herzogenaurach (DE)

( * ) Notice: Subject to any disclaimer, the term of this patent is extended or adjusted under 35 U.S.C. 154(b) by 784 days.

(21) Appl. No.: 12/291,477

(22) Filed: Nov. 10, 2008

(65) Prior Publication Data
US 2009/0127049 A1    May 21, 2009

(30) Foreign Application Priority Data

Nov. 15, 2007    (DE) .................. 10 2007 054 584

(51) Int. Cl.
*F16H 45/02* (2006.01)
(52) U.S. Cl. ..................... 192/3.3; 192/109 F
(58) Field of Classification Search ........ 192/3.29, 192/3.3, 85.34, 85.35, 85.4, 85.46, 109 F
See application file for complete search history.

(56) References Cited

U.S. PATENT DOCUMENTS

| | | | | |
|---|---|---|---|---|
| 3,171,522 A | * | 3/1965 | Petrie et al. ............. | 192/85.4 X |
| 4,371,066 A | * | 2/1983 | Fujioka et al. ........... | 192/85.34 |
| 4,623,055 A | * | 11/1986 | Ohkubo .................... | 192/85.34 |
| 4,934,502 A | * | 6/1990 | Horsch .................... | 192/85.34 |
| 5,090,539 A | * | 2/1992 | Wolf et al. ............... | 192/85.34 |
| 5,211,270 A | * | 5/1993 | Tamura et al. ............ | 192/3.29 |
| 5,857,666 A | * | 1/1999 | Zhi-Peng et al. | |
| 5,960,923 A | * | 10/1999 | Araki ...................... | 192/85.34 |
| 5,967,283 A | * | 10/1999 | Kemper | |
| 6,003,647 A | * | 12/1999 | Kawamura et al. ........ | 192/3.29 |
| 6,427,821 B1 | * | 8/2002 | Lee ........................ | 192/109 F |
| 6,543,596 B2 | * | 4/2003 | Martin et al. ............. | 192/85.4 |
| 6,659,251 B2 | * | 12/2003 | Ohkubo et al. ........... | 192/85.4 |
| 6,814,202 B1 | * | 11/2004 | Johann et al. ............ | 192/3.3 X |
| 6,892,869 B2 | * | 5/2005 | Ookita et al. ............. | 192/85.34 |
| 7,247,114 B2 | * | 7/2007 | Kaneda et al. ........ | 192/85.34 X |
| 7,350,631 B2 | * | 4/2008 | Furuichi ................ | 192/85.34 X |
| 2001/0007383 A1 | * | 7/2001 | Schmid .................... | 192/3.29 |
| 2004/0050640 A1 | * | 3/2004 | Schmid .................... | 192/3.29 |
| 2004/0188207 A1 | * | 9/2004 | Leber ...................... | 192/3.29 X |
| 2004/0206593 A1 | * | 10/2004 | Schmid et al. .......... | 192/3.29 X |
| 2005/0263367 A1 | * | 12/2005 | Kita et al. | |
| 2006/0207853 A1 | * | 9/2006 | Ackermann et al. ....... | 192/3.29 |
| 2007/0039796 A1 | * | 2/2007 | Schroder et al. | |
| 2007/0181396 A1 | * | 8/2007 | Maienschein et al. ..... | 192/3.29 |
| 2007/0240965 A1 | * | 10/2007 | Ito .......................... | 192/109 F X |
| 2008/0314711 A1 | * | 12/2008 | Jayaram et al. | |

FOREIGN PATENT DOCUMENTS

DE    10352963 A1    5/2004

\* cited by examiner

*Primary Examiner* — Gregory Binda
*Assistant Examiner* — Matthieu Setliff
(74) *Attorney, Agent, or Firm* — Simpson & Simpson, PLLC

(57) ABSTRACT

A power transmission mechanism including at least one hydrodynamic component and a device for at least partially bridging over the transmission of power through the hydrodynamic component by means of a control device, having an actuating mechanism that can be charged by way of a chamber that is chargeable with a pressurizing agent, and at least one spring unit is interposed between the actuating mechanism and the device for at least partially bridging over the hydrodynamic component.

8 Claims, 3 Drawing Sheets

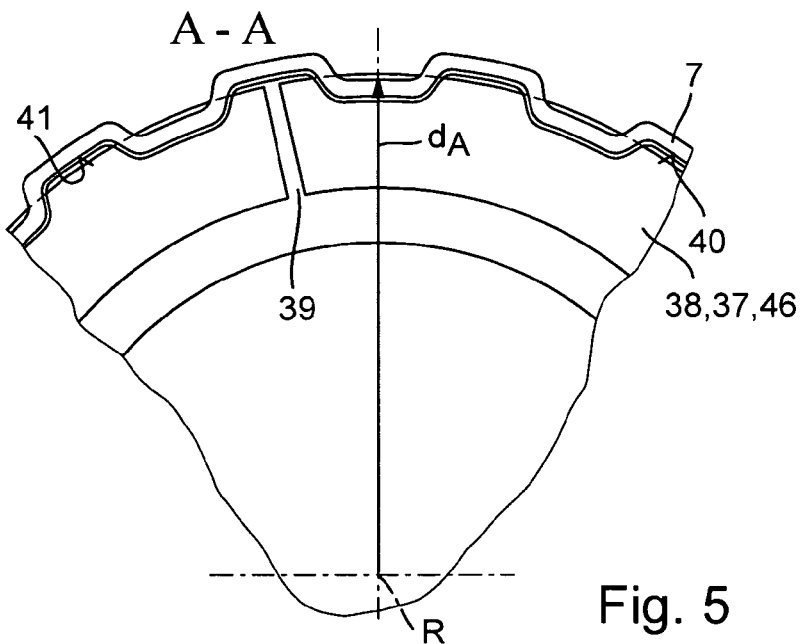
Fig. 5
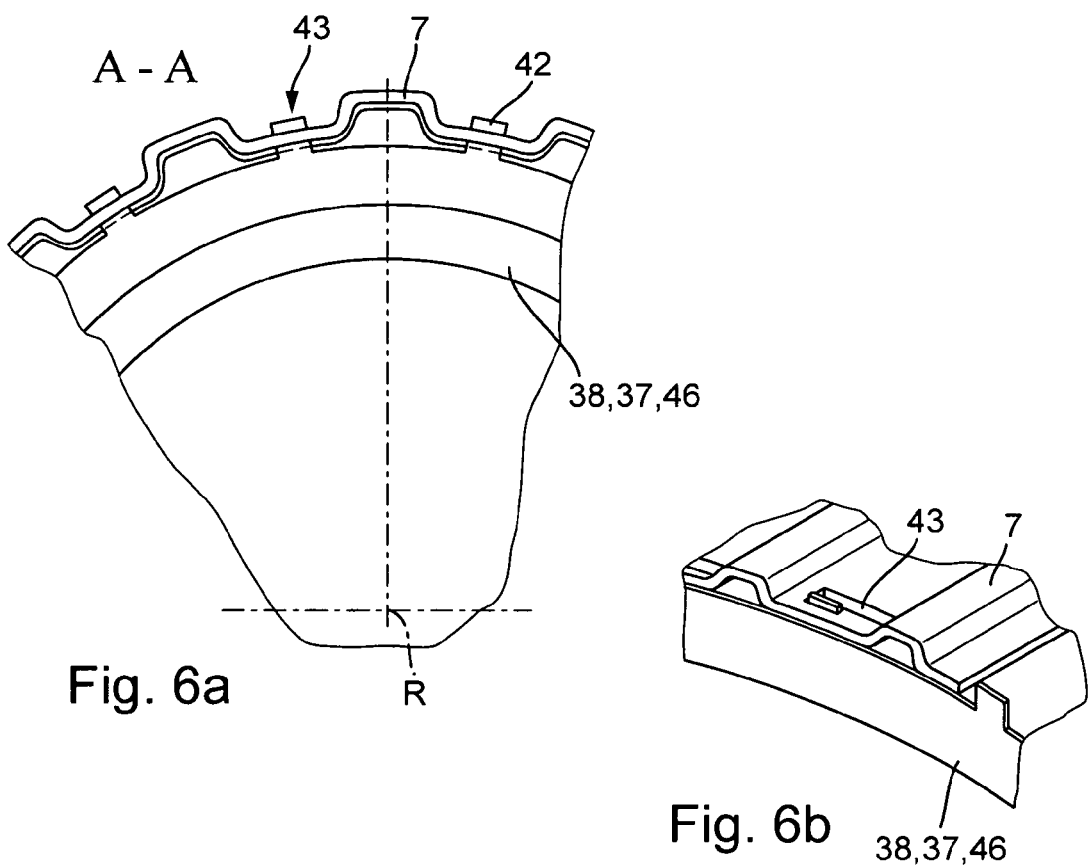
Fig. 6a
Fig. 6b

POWER TRANSMISSION MECHANISM

CROSS-REFERENCE TO RELATED APPLICATIONS

This patent application claims priority from German Patent Application No. 10 2007 054 584.5, filed Nov. 15, 2007, which application is incorporated herein by reference.

FIELD OF THE INVENTION

The invention relates to a power transmission mechanism, comprising at least one input and one output, a hydrodynamic component and a device for at least partially bridging over the transmission of power through the hydrodynamic component with a control device (12) assigned to the latter, comprising an actuating mechanism (13) that is actuatable by means of a chamber (15) that can be charged with a pressurizing agent.

BACKGROUND OF THE INVENTION

Power transmission mechanisms that can be implemented between a drive machine and a gear component in drive trains, particularly for mobile applications, and even more particularly for motor vehicles, are known in a multitude of versions from the existing art. These generally comprise an input and at least one output, where the input is coupleable with the drive machine directly or indirectly through additional transmission elements, and at least one output, which is connected to a gear component positioned after the power transmission mechanism, normally a manual gear-changing unit or a continuously variable transmission, and is formed by a transmission input shaft. Situated between the input and the output is a hydrodynamic component, preferably in the form of a hydrodynamic speed variator/torque converter. The latter includes at least one primary wheel that functions as a pump wheel when power is being transmitted from the input to the output, and one secondary wheel that functions in this power transmission direction as a turbine wheel. When executed as a hydrodynamic speed variator/torque converter, at least one guide wheel is also provided.

To bridge over the hydrodynamic component, a device is provided that is also known as a lockup clutch. The latter is normally designed as a switchable clutch operating on the principle of friction, and includes a first clutch part and a second clutch part, which may be brought into operative connection with each other, at least indirectly. The lockup clutch serves here as a coupling between the input and the output, in particular as the coupling in the connection between the input and pump wheel with the turbine wheel, or the connection between turbine wheel and output. Actuation of the switchable clutch is accomplished by way of a control device, which in its simplest form comprises an actuating device in the form of a piston element chargeable with a pressurizing agent.

If the power transmission mechanism is designed as a three-channel unit, it includes at least three connections: a first connection which is coupled with the working chamber of the hydrodynamic component; a second connection which is coupled with the interior of the power transmission mechanism; and, a third connection which is coupleable with a chamber that is chargeable with a pressurizing agent, which chamber is assigned to the actuating device and through which the pressure in the actuating chamber is freely adjustable.

In this design of three-channel construction, the control device is subjected to a separately controllable pressure. The flow-through direction of the hydrodynamic component is controlled through the other connections to the working chamber of the hydrodynamic component and the intermediate spaces between the hydrodynamic component and the lockup clutch or the control device. The flow-through is then either centripetal or centrifugal, depending on the mode of operation or the actuation of the connections in a pressurizing agent supply system to achieve a circuit that is in operation externally to the flow circuit that develops in the hydrodynamic speed variator/torque converter and is routed either within the power transmission mechanism or externally.

Power transmission mechanisms of this type are normally operated in two different operating modes, which differ in the flow of force through two different power branches; overlapping operation in both power branches is also possible. There the transmission of power in a first power branch takes place via the hydrodynamic component. In this case the lockup clutch is deactivated and the pump wheel is coupled with the input, while the turbine wheel is connected to the output in a rotationally fixed connection. For bridging, the lockup clutch is activated and the hydrodynamic component is removed from the power stream. However, that is normally accompanied by a strong engagement impact, which is caused in part by the non-equilibrium of the centrifugal oil pressures on the piston element of the control device for the lockup clutch.

Furthermore, the switchable clutch device can be closed actively by pressurizing the pressure chamber assigned to the control device, which is normally realized by a filling pulse in the hydraulics. This causes a relatively high volume flow, whereby the control device, in particular the piston element, is brought beyond the air space to bear against the individual clutch parts, in particular in the form of lamellae, and the necessary torque for the transmission is built up. At the same time it is necessary, however, that the filling pulse be controlled so that the flow volume becomes zero exactly at the moment when the piston element, i.e., the control device, touches the clutch parts, in particular lamellae. Otherwise there will be a strong pressure rise, which is manifested in an engagement impact.

In another case the control device is not in contact, and the engagement impact follows when an attempt is made to build up pressure on the converter clutch. This system is very sensitive to influences of tolerances and the environment, in particular friction, temperature and the centrifugal oil pressures, and thus is dependent on parameters that change during operation. The bridging clutch is path-controlled in the transition from the disengaged state to the power transmitting state, and is power-controlled in the power transmitting state. A disadvantage of the systems known heretofore is in particular the engagement impact, which has a negative impact on the driving behavior and also promotes wear. Such a design of a power transmission mechanism is described by way of example in published patent DE 103 52 963 A1.

BRIEF SUMMARY OF THE INVENTION

In one aspect, the present invention is a power transmission mechanism having a hydrodynamic component and a device for at least partially bridging over the flow of force through the hydrodynamic component with a control device assigned to it, comprising an actuating mechanism that is actuatable by means of a chamber chargeable with a pressurizing agent with freely adjustable pressure, is characterized in that at least one elastic element, in particular a spring element, is inserted between the actuating mechanism and the device for at least partially bridging over the hydrodynamic component.

Interposing elastic elements makes it possible to compensate in a simple manner for a momentary strong pressure rise while at the same time improving the feeling of the switching for the operator of such power transmission mechanisms, in particular in vehicles. The elastic element can be designed and constructed so that it is characterized by different elasticity characteristics in different directions, whereby properties may be produced that differ in their directional dependency. In particular, great stiffness is demanded in the circumferential direction and great elasticity, in particular a high modulus of elasticity, in the axial direction.

According to an especially advantageous embodiment, spring elements are employed as elastic elements. These are used to achieve a uniform distribution of force in the circumferential direction, preferably situated coaxially to the actuating mechanism and clutch device. Because of the properties of spring units, the spring unit enables the buildup of a force parallel to or proportional to the path on the device, to at least partially bridge over the hydrodynamic component. That mitigates or smoothes the transition from path control to power control, and the engagement impact can be reduced.

The device for bridging over the hydrodynamic component is designed as a switchable clutch device, comprising at least one first clutch part and one second clutch part, which can be brought into operative connection with each other at least indirectly through the control device, which include an actuating mechanism. The switchable clutch device here is normally based on frictional engagement. The elastic element, which is preferably designed as a spring unit, is situated in this case between the actuating device and one of the clutch parts. The clutch parts includes elements bearing friction surfaces and/or elements that have surface areas for a frictional pairing, which elements are guided on a support and can be brought into operative connection with elements having friction surfaces and/or elements that have surface areas for a frictional pairing on the other clutch part.

Since the clutch parts are normally designed of shaft and disk construction, the spring element is inserted here between the piston element and the switchable clutch element, in particular a clutch part. According to the invention, there are two basic possibilities for this with regard to the spatial arrangement of the elastic element, in particular of the spring unit regarded in the axial direction between the input and output of the power transmission mechanism. According to a first embodiment, the latter can be situated directly between the actuating element, in particular the piston element or the effective piston area of the piston element and a disk element of a clutch part or may be situated after the disk or lamina elements of the particular clutch part, ahead of a stop that braces the actuating force through the actuating device and is stationary in the axial direction, so that in this case according to the second embodiment the elastic element, in particular the spring unit is situated quasi in front of the element that produces the opposing force to the spring unit. In the simplest case this element is formed by a stationary stop, which may be made in a single piece with a clutch part, in particular a plate carrier, or is formed by a separate element, in particular one that is frictionally connected with the latter, for example a retaining ring.

The first embodiment enables simple integration, and thereby retrofitting from switchable clutch devices to the clutch device with a spring unit according to the invention. The second embodiment, when executed appropriately with concentration of the functions of stop and elastic element, enables especially space-saving construction in the axial direction. A further advantage of the placement of the spring units between the plate pack and the stop element consists in the fact that as the clutch torque becomes greater, the friction of displacement and thus the damping of the engagement impact are also increased.

The space-saving construction design can be achieved, according to an especially advantageous refinement of the second embodiment, by having the elastic element, in particular the spring unit, form a structural unit with the stop element, i.e., either being connected to the latter or sharing in assuming the function of the stop element. Assumption of the stop function is accomplished by fixing the spring element in the axial direction. This can be done by frictional or positive locking. The spring element and/or the particular clutch part must be modified accordingly.

A plurality of possibilities exists for coupling the spring unit when integrating or concentrating the functions with the stop element, as explained earlier. According to an especially advantageous embodiment, a positive lock in the form of a bayonet connection is chosen, with the outer diameter of the diaphragm spring or spring element being designed with appropriate projections, which are introduced into recesses on the clutch part and can be locked together with the latter in the circumferential and/or axial direction.

The elastic element, in particular the spring unit, is situated coaxially to the clutch device or the axis of rotation of the clutch device. As a result, normally only one element is needed. The guidance can be accomplished in a simple manner. Also conceivable are designs with a plurality of elastic elements, which are situated in the circumferential direction preferably at uniform intervals from each other on a common diameter and parallel to the axis of rotation. Fixing the position is substantially more difficult in this case, however.

There is a plurality of possibilities for the spring unit to be used. In the simplest cases it is formed by at least one diaphragm spring, with the inner diameter and the outer diameter of the diaphragm spring being chosen so that they are situated in the area of the radial extension of the elements of the clutch parts that form the frictional surfaces, and also cannot extend beyond it in the tensioned state, so that flat contact can be realized over the diaphragm springs, at least in partial areas. A significant advantage of using a diaphragm spring consists in the improved distribution of surface pressure.

A possible second embodiment consists in the use of spring washers. These are ring-shaped elements with a wave-like structure in the circumferential direction, where the alternating wave crest and valleys form contact surface areas for contact with the effective piston area and also on the respective element of the clutch part.

Depending on the design of the individual spring units, they can be used to realize any spring characteristics desired, in particular with regard to spring stiffness. Furthermore, diaphragm springs in particular can be modified so that spring characteristic curves with a non-linear pattern can be achieved.

Especially advantageous is the solution according to the invention with power transmission mechanisms having a hydrodynamic component and a device for at least partial bridging, of three-channel construction. In this case the actuating device is controlled with a pressure that is adjustable independent of the pressure in the hydrodynamic component. The pressurization occurs through another additional connection, which may be integrated into the operating fluid carrying and supply system of the hydrodynamic component or may have a system of its own assigned to it.

An object of the invention is to further develop a power transmission mechanism of the type named at the beginning, in particular having a hydrodynamic component and a device for at least partially bridging over the latter, in such a way that the engagement impact is largely prevented, or at least the transition between the path-controlled and the power-controlled operating modes is substantially softer, by lessening the pressure increase.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 5 illustrates, on the basis of a detail from a sectional view in a view from the right, a first embodiment of the concentration of functions between the spring unit and a stop element;

FIG. 6a illustrates, on the basis of a detail from a sectional view in a view from the right, a second embodiment of the concentration of functions between the spring unit and a stop element; and, FIG. 6b illustrates, on the basis of a detail from a sectional view in a view from the right, a second embodiment of the concentration of functions between the spring unit and a stop element.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
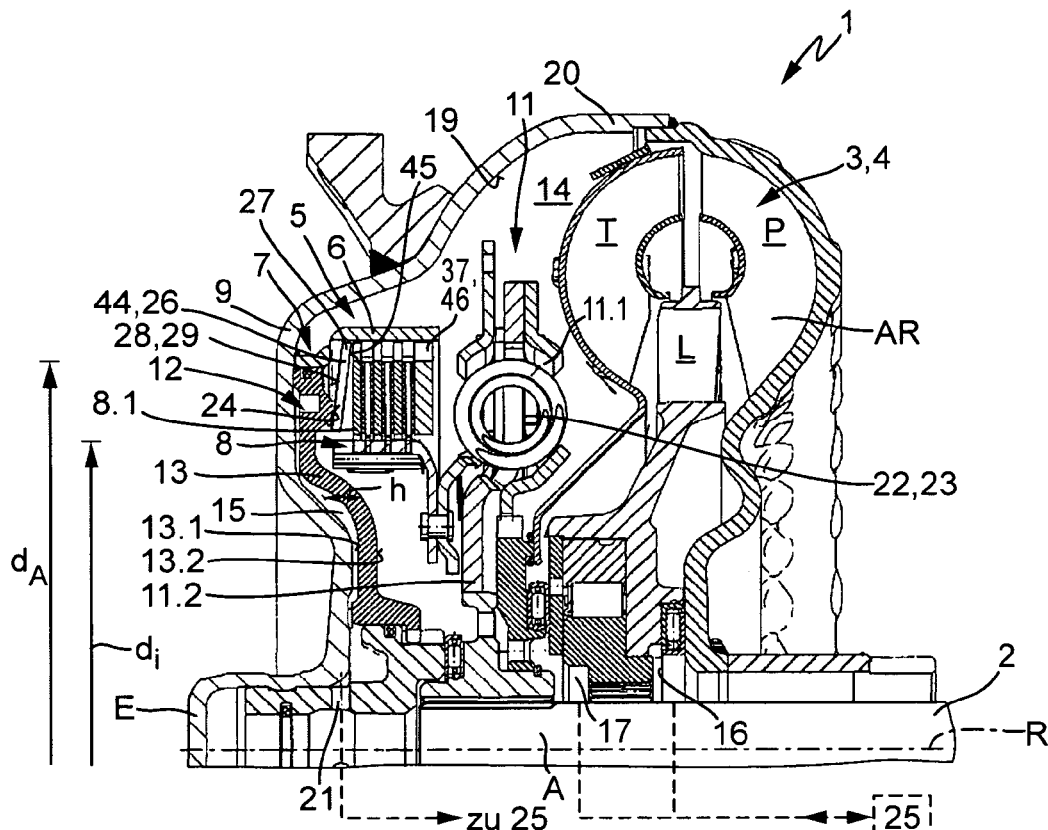
FIG. 1 illustrates a first variant of a first embodiment of a power transmission mechanism according to the invention, having an integrated spring unit in the device for bridging over the hydrodynamic component.

Adverting now to the figures, FIG. 1 illustrates, in a simplified schematic depiction, a detail from an axial section of a power transmission mechanism 1 designed according to the invention. It is situated in a power train between a drive unit, in particular a drive engine not depicted here, and a power take-off or driven unit not depicted here in greater detail, for example a transmission, and serves to transmit power, in particular torque. To that end, power transmission mechanism 1 has at least one input E and one output A. Input E is coupleable at least indirectly with the driving engine, not shown here, while output A can be connected to a take-off, normally the gear unit down-line from the power transmission mechanism 1, and is formed by a shaft, in particular a transmission input shaft 2. Situated between input E and output A is a hydrodynamic component 3. Hydrodynamic component 3 includes at least one primary wheel which functions as pump wheel P when power is transmitted between input E and output A, and one secondary wheel which functions as the turbine wheel when power is transmitted from input E to output A, where the pump wheel P is connected to input E in a rotationally fixed connection in this functional state, preferably being coupled with the latter in a rotationally fixed connection or constituting it. Furthermore, turbine wheel T is connected to output A at least indirectly, that is, either directly or else indirectly through additional transmission elements.

In the depicted case, hydrodynamic component 3 is executed as a hydrodynamic speed variator/torque converter. This converts rotational speed and torque simultaneously. To that end, hydrodynamic component 3 includes at least one guide wheel L. The individual impellers P, T, L bound a working space AR, in which the flow circuit develops. Also conceivable, although not depicted here, is the implementation of hydrodynamic component 3 also as a hydrodynamic clutch. In this case no guide wheel is provided for the conversion.

Power transmission mechanism 1 also includes at least one device 5 for at least partial bridging of hydrodynamic component 3, i.e., bypassing the power stream through hydrodynamic component 3. The device 5 is executed as a switchable clutch device 6, and is normally referred to as a lockup clutch. It is designed as a frictionally engaged clutch, preferably in the form of a disk clutch, most especially preferably in the form of a multi-plate clutch. To that end, switchable clutch device 6 includes a first clutch part 7 and a second clutch part 8, which can be brought at least indirectly into operative connection with each other. To that end the individual clutch parts 7 and 8 each comprise at least one, preferably a plurality of lamellae, which are movably guided on a corresponding lamella carrier, there being a stop 37 provided in the axial direction on at least one of the two lamella carriers, on which the actuating force is supportable when control device 12 is actuated.

In the illustrated case, the first clutch part 7 is connected at least indirectly to input E; here the connection is direct and rotationally fixed. The coupling is accomplished here by coupling the first clutch part 7, implemented as the outer lamella carrier with outer lamellae, with housing cover 9, which is connected in a rotationally fixed connection with pump wheel shell 10 and thus is rotationally fixed to pump wheel P. Housing cover 9 and pump wheel shell 10 form the housing 20. Housing cover 9 can also be of multi-piece construction. Pump wheel shell 10 is preferably implemented as an integral component of pump wheel P, and extends at an interval in the radial direction and in the axial direction at least partially in the circumferential direction around turbine wheel T.

At the same time, housing part 9 can already take over the function of input E of power transmission mechanism 1. Second clutch part 8 is at least indirectly connected to output A, i.e., directly or indirectly in a rotationally fixed connection. The rotationally fixed connection is accomplished in the illustrated case indirectly by way of a device 11 for damping vibrations, comprising at least one damper unit which may be constructed as an individual damper or as a series or parallel damper. The two clutch parts 7 and 8 can be brought into operative connection with each other by means of control device 12 in the form of an actuating device.

Control device 12 includes a piston element 13, which is chargeable with a pressurizing agent. The charging with pressurizing agent is accomplished here by means of a pressure chamber 15, which is sealed pressure-tight relative to the interior 14 of power transmission mechanism 1. The sealing is accomplished by pressure-tight and fluid-tight linking of piston element 13 to housing 20, in particular housing cover 9. Chamber 15, which is chargeable with a pressurizing agent, is assigned to piston element 13; piston element 13 preferably forms a movable wall of this pressure chamber 15.

Power transmission mechanism 1 is designed in three-channel construction. The pressurization and actuation of switchable clutch device 6 can be accomplished by pressurizing pressure chamber 15, independently of the pressure conditions that exist within the rest of power transmission mechanism 1. At least two connections are assigned to hydrodynamic component 3 for the sake of its functioning and to realize different flow directions: a first connection 16, which is connected to the working chamber AR formed by pump wheel P and turbine wheel T, and a second connection 17, which is connected to the interior space 14 formed between hydrodynamic component 3, in particular the outer circumference 18 of hydrodynamic component 3, and the inner circumference 19 of housing 20. Situated in the inner space 14 is switchable clutch device 6, as well as the apparatus 11 for damping vibrations. Depending on the pressure conditions present at the individual connections 16 and 17, the flow through hydrodynamic component 3 is either centrifugal or centripetal.

The flow of force between input E and output A through hydrodynamic component 3 describes a first power branch I, the flow of force through device 5 describes a second, in particular a mechanical power branch II. The flow of force in hydrodynamic branch I takes place solely through hydrodynamic component 3, i.e., from input E to output A through the coupling of turbine wheel T with output A, in particular transmission input shaft 2. In the illustrated case, as already explained, the coupling does not take place directly but through device 11 for damping vibrations, whose input part 11.1 is connected to the turbine wheel in a rotationally fixed connection and whose output part 11.2 is connected to the output in a rotationally fixed connection. The coupling between input part 11.1 and output part 11.2 is accomplished through means 22 for transmission of torque and means 23 for damping coupling; the means 22 for transmission of torque and the means 23 for damping coupling can be formed by one unit.

Since the hydrodynamic transmission of power in interaction with a driving engine is characterized by an optimal level of efficiency only in a certain rotational speed range, and in particular since as the sole transmitter of power it operates as a matter of principle with high slippage and poor efficiency for the main driving range, hydrodynamic component 3 is bridged over. To that end, the lockup clutch in the form of switchable clutch device 6 is activated.

This is accomplished by activating control device 12, in particular applying a pressure to pressure chamber 15 through a connection 21. At the same time, the pressure that is present in pressure chamber 15 is not solely responsible for creating the contact force. Also critical are the pressure relationships at the opposing piston faces 13.1 and 13.2, where 13.1 forms a wall of pressure chamber 15 and 13.2 forms a wall of interior space 14. Piston element 13 needs to be activated here; in particular on its contact surface that forms the effective piston area 24 on the piston face 13.2 it must be brought into operative connection or into contact with first clutch part 7 or second clutch part 8. To that end a filling pulse is applied in pressure chamber 15. This is accomplished through a pressurizing agent supply and/or carrying system 25, where preferably the same pressurizing agent supply or carrying system can be used here as for hydrodynamic component 3; that is, preferably pressure chamber 15 is integrated into the same system but is actuatable separately. Here piston element 13, in particular the effective piston area 24, moves into contact with one of the clutch parts 7, 8. Until then the actuation is path-controlled.

To avoid an abrupt pressure rise, which manifests itself in an engagement impact in the transition from the disengaged to the regulated, power-controlled range in which the transmissible torque is adjusted or regulated, at least one elastic element 44, in particular a spring unit 26, is inserted between control device 12, in particular piston element 13, and switchable clutch device 6.

FIG. 1 illustrates a first embodiment, in which the insertion is made between the effective piston area 24 and a clutch part, in this case an element, in particular a lamina of second clutch part 8, where in the depicted case the outermost end lamina 8.1 is provided for that purpose. Spring unit 26 is designed to that end in the depicted case in an especially advantageous manner as a diaphragm spring 27, which, when regarded in the radial direction, is guided on one of the clutch parts, first clutch part 7 or second clutch part 8. Preferably it is guided on the clutch part on which spring element 26, in this case the diaphragm spring, is not acting directly.

In FIG. 1, diaphragm spring 27 is therefore guided on first clutch part 7, regarded in the radial direction, in particular the clutch carrier of first clutch part 7. Diaphragm spring 27 in this case is a disk spring. The latter is characterized by a nominal diameter that corresponds to the inside diameter and is identified here as $d_I$, as well as by an outside diameter $d_A$. Diaphragm spring 27 is also characterized by a height h in the relaxed state, which corresponds here to the extension in the axial direction in the installed position. Diaphragm spring 27 here is dimensioned so that the nominal diameter $d_I$ is chosen so that it lies within the range of the radial extension of the first and/or second clutch part 7, 8, so that it is ensured that diaphragm spring 27 can enter into operative connection with an element of first clutch part 7 or second clutch part 8, in particular in the range of its outside diameter $d_A$, in that the inner side quasi comes into contact with the particular clutch part 7 or 8, forming a reaction surface 45 that acts on the clutch part, in this case end lamina 8.1. At the same time the outer surface 28 preferably forms directly a contact surface 29 for piston element 13. The effective piston area 24 of piston element 13 at the same time is preferably also in contact with spring element 26 in the relaxed state.

Because of the interposition of diaphragm spring 27 according to the invention, the transition from path-controlled to force-controlled operation is substantially gentler here, in that the increase in pressure is converted to spring work based on the characteristic curve of the spring. The reduction of the pressure rise here is a function of the design of spring unit 26, in particular of diaphragm spring 27. Various types of characteristic curves can be realized in this way, depending on the design, by changing the height h and the thickness of the spring, where different spring stiffnesses can be produced depending on the design of the ratio between the height and the thickness.

FIG. 1 illustrates an especially advantageous embodiment, which is characterized by low design expense and in addition can be retrofitted without major additional cost in already existing power transmission devices that lack such spring units 26. In addition, the design as a diaphragm spring 27 also enables the design of the spring characteristic to be matched to the actual requirements of the individual case.

Figure 2:
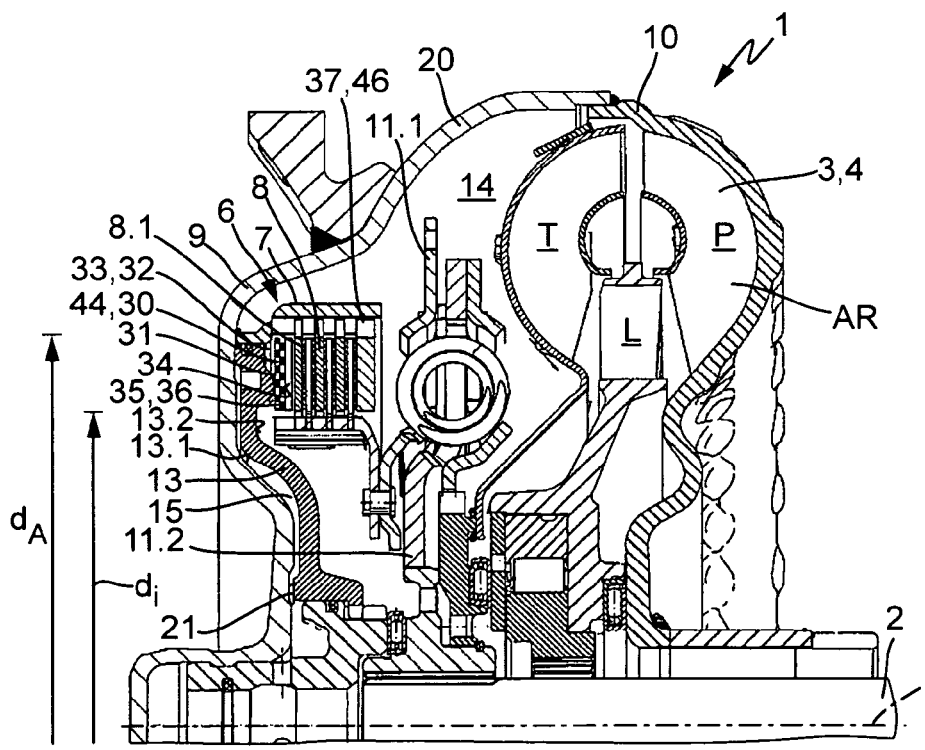
FIG. 2 illustrates a second variant of a first embodiment of a power transmission mechanism according to the invention, having an integrated spring unit in the device for bridging over the hydrodynamic component.

This is also true by analogy for the embodiment depicted in FIG. 2, which corresponds to the design according to FIG. 1, so that the same reference labels are used for like elements. Here, however, the spring unit 26 in the form of diaphragm spring 27 has been replaced by a spring washer 30. The rest of the construction corresponds to that described in FIG. 1, so that the same reference numbers are used for the same elements. Spring washer 30 is designed as a ring-disk-shaped element; it is also characterized here by an inside diameter dI and an outside diameter $d_4$. Both diameters fall within one range, regarded in the radial direction, which corresponds to the extension of the friction surfaces of the individual clutch parts 7, 8 in the radial direction.

Spring washer 30 is characterized by projections and recesses in alternating directions, when regarded in the circumferential direction, so that a wavy structure results overall. At the same time, when regarded in the installation position, the projections 32 oriented toward a face 31 directed at piston element 13 form contact surface areas 33 for interaction with the effective piston area 24, while the provided projections 35 that are oriented to the opposite side to face 31 form contact surface areas 36 for contact with a clutch part, in this case the first lamella 8.1 of second clutch part 8. This solution is characterized spatially by an especially space-saving design, regarded in the axial direction between input E and output A. Only the thickness of spring washer 30 must be taken into account here, as well as a small air space.

FIGS. 1 and 2 illustrate different exemplary embodiments of design for a first embodiment of the solution according to the invention. One embodiment according to FIG. 1 can also be characterized by connection of a series of such diaphragm springs 27, there being at least two diaphragm springs situated coaxially to each other and one after the other. The same is true of the spring washers 30 according to FIG. 2. The remainder of the constructive design corresponds to the design known from the existing art. Here too, first clutch part 7 and second clutch part 8 are executed in lamellar construction, including an appropriate lamella carrier, on which the respective lamellae designed as inner or outer lamellae can be guided so that they are movable in the axial direction, and also a stop element 37. Stop element 37 is preferably designed in the form of a retaining ring 46, and serves to secure the switchable clutch device axially, in particular during the interaction of the individual clutch parts 7 and 8 with each other in bridged-over operation. The actuating force of piston element 13 is braced through retaining ring 46.

Figure 3:
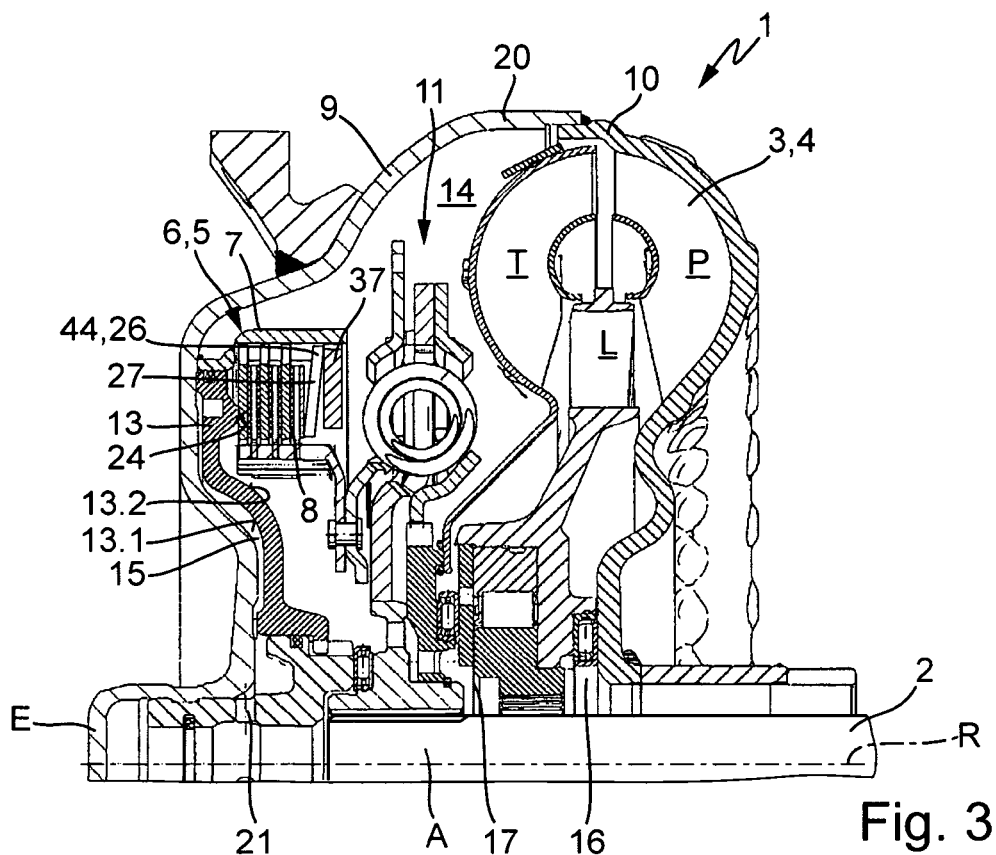
FIG. 3 illustrates a first variant of a second embodiment of a power transmission mechanism according to the invention, having an integrated spring unit in the device for bridging over the hydrodynamic component.

In contrast, FIG. 3 illustrates by way of example a design of a second version of the solution according to the invention, in which the elastic element 44, in particular spring element 26, is inserted between piston element 13 and switchable clutch device 6, but regarded in the axial direction spatially between input E and output A, not between piston element 13 or the effective piston area 24 and one of the clutch parts 7 or 8, in particular the first lamella of either the first or the second clutch part 7, 8, but rather regarded spatially between input E and output A is quasi located after the two clutch parts 7 and 8 in the axial direction, where here the arrangement is preliminary ordered ahead of stop 37, in particular in the form of a retaining ring 46, as depicted in FIG. 3.

Elastic element 44 and stop 37 are formed by separate components. Elastic element 44, in particular diaphragm spring 27, is guided in the radial direction on the first component. Diaphragm spring 27 is supported in the area of the nominal diameter on second clutch part 8. Here too, the extension of diaphragm spring 27 occurs essentially in the area of the radial extension of the friction surfaces of clutch device 6.

Figure 4:
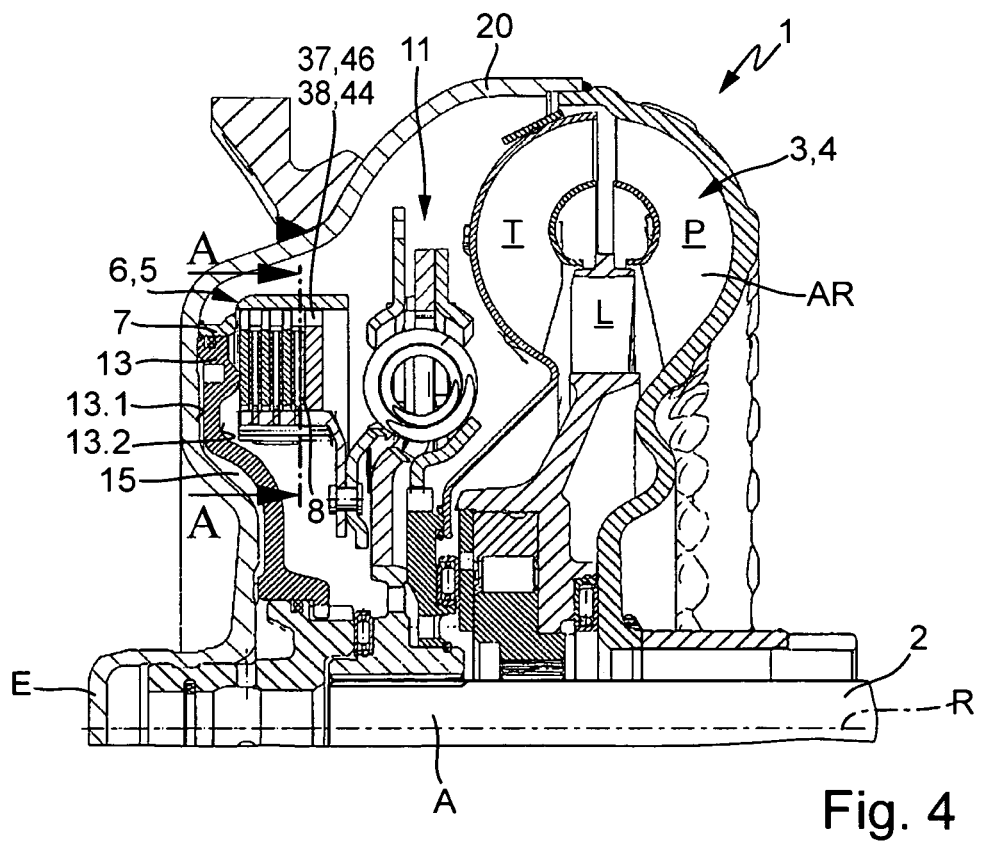
FIG. 4 illustrates a second variant of a second embodiment of a power transmission mechanism according to the invention, having an integrated spring unit in the device for bridging over the hydrodynamic component.

In an alternative embodiment according to FIG. 4, stop 37 and elastic element 44 form a single structural element 38. This version with concentration of functions is characterized by small size with regard to the requisite construction space. Depending on the design of the integral module 38, the latter can be designed free of modifications at the connecting elements, in particular the guide devices. It can then be installed in existing systems free of the need for additional construction space, as a substitute for the stationary stop or retaining ring.

According to FIG. 4, in an especially advantageous design diaphragm spring 27 is integrated into retaining ring 46 and thus into axial stop 37, or constitutes the latter. The integration can be accomplished in various ways. Preferably these elements form a single structural unit 38, or spring unit 26 is designed as a retaining ring 46. This is reproduced in FIG. 5 in a simplified schematic depiction on the basis of a detail in a view from the right according to a sectional view A-A in FIG. 4. In this version, diaphragm spring 27 is designed as a retaining ring 46. Diaphragm spring 27 is of uninterrupted design here, regarded in the circumferential direction; that is, it has an opening 39 that extends through the entire area of the spring, regarded in the axial and radial directions, and thus forms a quasi nearly complete ring segment.

This ring segment, which extends almost completely in the circumferential direction, is situated in guide grooves 40 on the particular clutch part 7 or 8, in this case the first clutch part 7, where the guide grooves 40 extend completely around the inner circumference of the clutch carrier of first clutch part 7 in the circumferential direction of axis of rotation R, and diaphragm spring 27 is designed so that its outer circumference $d_A$ is located quasi in the area of the radial inside dimensions of guide groove 40 and thus can be received by the latter, and is guided in the latter in the axial direction on the stops formed by the groove walls. Also visible in FIG. 5 are the guide grooves 41 for the individual lamellae of the individual clutch parts, here of clutch part 7, which run perpendicular to the guide grooves 40 and parallel to the axis of rotation R.

According to an alternative design to FIG. 5, spring unit 26, in particular diaphragm spring 27, can likewise be designed as a structural unit 38 with a retaining ring 46 and a stop 37. To that end, according to FIG. 6 the spring element is preferably designed with a closed contour in the circumferential direction, and is connected by a positive connection 43 in the form of a bayonet connection to the respective clutch part, here clutch part 7, in particular the plate carrier of clutch part 7. Positive connection 43 is designed as a bayonet connection, as already explained, and thus enables securing for the spring unit in the axial direction, the circumferential direction and possibly also the radial direction. To that end the spring unit, in particular diaphragm spring 27, is designed with radial projections 42, which can be placed in the cutouts provided for that purpose on the plate carrier. The cutouts on the plate carrier are designed so that the positive lock is fixed in its position by twisting the spring unit in the circumferential direction and moving it in the axial direction. Other designs are also conceivable. FIG. 6a illustrates a view according to FIG. 5. FIG. 6b illustrates a detail of a perspective view.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE LABELS 1 power transmission mechanism
2 transmission input shaft
3 hydrodynamic component
4 hydrodynamic speed variator/torque converter
5 device for at least partial bridging of the hydrodynamic component
6 switchable clutch device
7 first clutch part
8 second clutch part
8.1 first lamella
9 housing part
10 pump wheel shell
11 device for damping vibrations
12 control device
13 piston element
13.1, 13.2 piston face
14 interior space
15 pressure chamber
16 connection
17 connection
18 outer circumference
19 inner circumference
20 housing
21 connection
22 means of torque transmission
23 means of damping coupling
24 effective piston area
25 pressurizing agent transport and/or carrying system
26 spring unit
27 diaphragm spring
28 outer surface
29 contact surface
30 spring washer
31 face
32 projection
33 contact surface areas
34 face
35 projection
36 contact surface area
37 stop
38 structural unit
39 opening
40 guide groove
41 guide groove
42 projection
43 positive connection
44 elastic element
45 reaction surface
46 retaining ring
E input
A output
P pump wheel
T turbine wheel
L guide wheel
AR working space
I, II power branch
$d_I$ inside diameter, nominal diameter
$d_A$ outside diameter
h height

What is claimed is:

1. A power transmission mechanism, comprising:
an input;
an output;
a turbine;
a pump; and,
a clutch arranged to form a portion of a torque path from the input to the output, the clutch including:
at least one axially displaceable lamellae;
an axial stop;
a displaceable piston element arranged to engage the at least one axially displaceable lamellae with the axial stop; and,
an elastic element formed as a single structural unit with the axial stop, wherein the elastic element is designed as a spring washer segment with nearly complete extension in the circumferential direction and is guided in a guide groove formed in the circumferential direction on one of the clutch parts.

2. The power transmission mechanism recited in claim 1, wherein the elastic element is fixed in its position in the circumferential direction and the axial direction by means of a bayonet connection on one of the clutch parts.

3. The power transmission mechanism recited in claim 1, wherein the elastic element is situated coaxially to the axis of rotation of the power transmission.

4. The power transmission mechanism recited in claim 1, wherein an effective area of the elastic element corresponds to at least a portion, preferably the radial extension, of the clutch parts which can be brought into operative connection with each other.

5. The power transmission mechanism recited in claim 1 comprising a three-channel unit, including at least:
a connection coupled with the working space of the hydrodynamic component;
a connection coupled with the interior space enclosed by a housing; and
a connection coupled with the chamber that is chargeable with a pressurizing agent, wherein the pressure in the chamber is chargeable with the pressurizing agent.

6. The power transmission mechanism recited in claim 1, wherein the turbine and the pump are included in a hydrodynamic speed variator/torque converter including at least one guide wheel.

7. A power transmission mechanism, comprising:
at least one input and one output;
a hydrodynamic component;
at least one elastic element; and,
a device for at least partially bridging over the transmission of power through the hydrodynamic component with a control device assigned to the hydrodynamic component, comprising an actuating mechanism being actuatable by means of a chamber that can be charged with a pressurizing agent, wherein:
the device for at least partially bridging over the hydrodynamic component includes at least one switchable clutch device having an axial stop, at least one first clutch part, and one second clutch part, wherein the at least one first clutch part and the second clutch part can be brought into operative connection with each other at least indirectly by means of the actuating mechanism, and in that the actuating mechanism has an effective piston area that comes to act on one of the at least one first clutch part or the second clutch part;

the elastic element forms a single structural unit with the axial stop; and, the elastic element is designed as a spring washer segment with nearly complete extension in the circumferential direction and is guided in a guide groove formed in the circumferential direction on one of the at least one first clutch part or the second clutch part and forming an axial stop surface.

8. A power transmission mechanism, comprising:

at least one input and one output;

a hydrodynamic component;

at least one elastic element; and, a device for at least partially bridging over the transmission of power through the hydrodynamic component with a control device assigned to the hydrodynamic component, comprising an actuating mechanism being actuatable by means of a chamber that can be charged with a pressurizing agent, wherein:

the device for at least partially bridging over the hydrodynamic component includes at least one switchable clutch device having an axial stop, at least one first clutch part, and one second clutch part, wherein the at least one first clutch part and the second clutch part can be brought into operative connection with each other at least indirectly by means of the actuating mechanism, and wherein the actuating mechanism has an effective piston area that comes to act on one of the at least one first clutch part or the second clutch part;

the elastic element forms a single structural unit with the axial stop; and, the elastic element is fixed in its position in the circumferential direction and the axial direction by means of a bayonet connection on one of the at least one first clutch part or the second clutch part.

* * * * *